April 29, 1969 F. MASSA, JR 3,441,903

ELECTROACOUSTIC TRANSDUCER WITH IMPROVED ELECTROMAGNETIC DRIVE

Original Filed Feb. 1, 1966 Sheet 1 of 2

INVENTOR
FRANK MASSA JR.
BY [signature]
ATTORNEY

ELECTROACOUSTIC TRANSDUCER WITH IMPROVED ELECTROMAGNETIC DRIVE

Original Filed Feb. 1, 1966

INVENTOR
FRANK MASSA JR.
BY [signature]
ATTORNEY 3,441,903

ELECTROACOUSTIC TRANSDUCER WITH IMPROVED ELECTROMAGNETIC DRIVE

Frank Massa, Jr., Cohasset, Mass., assignor to Massa Division, Dynamics Corporation of America, Hingham, Mass.

Original application Feb. 1, 1966, Ser. No. 524,013, now Patent No. 3,363,227, dated Jan. 9, 1968. Divided and this application Sept. 22, 1967, Ser. No. 683,751
Int. Cl. H04b 13/00
U.S. Cl. 340—8 10 Claims

ABSTRACT OF THE DISCLOSURE

The invention provides an improved electromagnetic transducer made from laminates, which may be extremely thin, and which are nestingly bonded in cup-shaped openings on spaced parallel plates. The laminate may be made by winding ribbons of magnetic material on coil winding equipment. By changing the widths of the ribbons, it is possible to build a magnetic structure having a concentric annular slot for receiving an electrical coil. The entire unit is bonded together with a suitable material, such as an epoxy cement.

This is a division of an application having the same title, Ser. No. 524,013, filed Feb. 1, 1966, now Patent No. 3,363,227, and assigned to the same assignee.

This invention is concerned with an improved electromagnetic transducer, and, more particularly, with an improved electromagnetic design which is particularly advantageous for efficient operation of electroacoustic transducers operating in the mid and high audible frequency regions.

It is well known that electromagnetic circuits which must operate efficiently at the higher frequencies must have magnetically-conducting elements which employ thin laminations in order to reduce the eddy-current losses in the magnetic core. The lamination thickness must be particularly reduced if a high operating flux density is required in the magnetic circuit. The eddy-current losses are proportional to $t^2f^2B^2$, where $t$ is the lamination thickness, $f$ is the frequency, and B is the peak value of the alternating flux density. It can be seen readily from the above relationship that as the frequency and flux density increase in a magnetic circuit, the thickness of lamination must be reduced in order to hold the eddy-current losses to reasonable levels so that the efficiency of the electroacoustic transducer can be kept at an acceptable level.

The conventional method of laminating a magnetic circuit consists in employing stacks of thin magnetic stampings which are held together by a bonding cement or by bolts or clamps. For electromagnetic circuits operating at the lower audio frequencies the lamination thickness may be of the order of 1/64", and the problem of stacking flat laminations of such thickness presents no difficulty in the handling and assembling of the stampings. When laminations have to be used in which the thickness is reduced to the order of only a few thousands of an inch or less the cost of handling many thousands of paper-thin laminations becomes very high. My invention solves this problem with a new design of an electromagnetic transducer for efficient high-power operation, which employs large quantities of thin magnetic lamination material without the necessity of handling individual thin stampings.

It is a primary object of my invention to produce a laminated electromagnetic circuit for use in operating an electroacoustic transducer which eliminates the need for stacking and handling large quantities of very thin stampings such as are required in conventional designs.

It is another object of my invention to increase the electromagnetic efficiency of an electromagnetic transducer by employing a design of magnetic structure and associated current coils such that 100% of the conductor used in the coils is actively linked with the magnetic circuit.

A still further object of my invention is to improve the method of assembling an electromagnetic circuit employing the permanent magnets for polarization to achieve accurate control and maintenance of a uniform air gap even when the dimensions of the structure over which the air gap is to be maintained are very large.

Another object of my invention is to produce an improved electromagnetic transducer employing an inertial type of electromagnetic drive whereby 100% of the electrical and magnetic materials are closely coupled for creating increased electromagnetic driving forces whereby the efficiency of the transducer is increased over conventional designs.

The novel features that I consider characteristic of my invention are set forth with particularity in the appended claims. The invention, itself, however, both as to its organization and method of operation, as well as its advantages thereof, will best be understood from the following description of several embodiments thereof when read in connection with the accompanying drawings in which:

Figure 1:
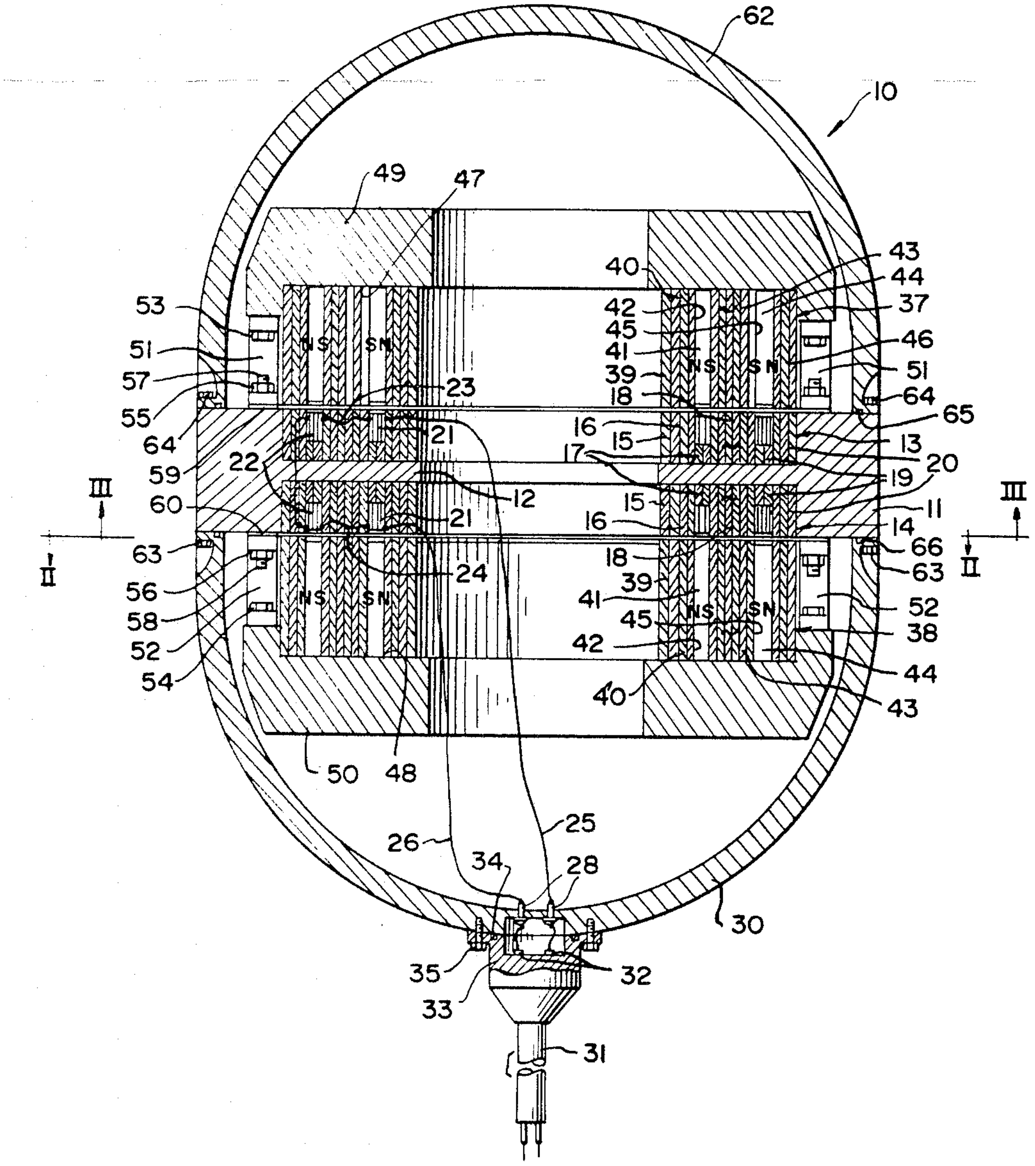
FIG. 1 is a cross-sectional view taken in a plane containing the center line of one type of transducer illustrating the embodiment of my invention.

Referring to the drawings, reference numeral 10 generally designates an electroacoustic transducer employing an electromagnetic drive system constructed in accordance with this invention. The transducer 10 comprises rigid circular plate 11 having a pair of parallel plane surfaces. Both sides of plate 11 are counter-bored, as illustrated, to provide two recessed sections with an intervening annular web portion 12. A hole is shown through the center of web portion 12, the purpose of which is only to eliminate unneccessary weight from the vibrating structure. Two tightly-wound annular assemblies 13 and 14 of thin magnetically-conducting ribbon are securely bonded to the opposite faces of the web member 12 such that plate member 11 becomes an integrated rigid structure in combination with magnetic assemblies 13 and 14. Magnetic assemblies 13 and 14 are substantially identical in the construction illustrated in FIG. 1. Each assembly is so formed as to provide an E-shaped magnetic cross-section.

One method which I have found very satisfactory for preparing each of the assemblies 13 and 14 is to employ a circular piece of rigid tubing 15 as a form which is attached to a lathe or other similar coil-winding equipment. A roll of continuous thin magnetic ribbon or tape, illustrated in cross-section by the reference character 16, is wound tightly over the form 15 using an adhesive such as epoxy between successive layers as the thin magnetic ribbon or tape 16 is wound over the for 15. When the desired thickness of the wound magnetic tape is achieved, the full width tape 16 is replaced by a narrower magnetic tape 17 and the winding continued until the desired thickness of the narrow tape 17 is built up, as illustrated. Next, a ring-shaped form is placed adjacent to the wound narrow section 17 to fill the space between the narrow tape 17 and the full width tape 16 to provide a continuous surface for continuing the winding of the wide magnetic ribbon or tape 16 to provide a center portion 18 of the magnetic E-shaped assembly which is shown in cross-section in FIG. 1. After the center section is built up to the required amount, a narrow ribbon or tape 19 is used to continue the formation of the second annular slot in the E-shaped cross-section, and, finally, a second ring-shaped form is inserted to provide a continuous surface for winding a final section 20 of wide ribbon to complete the fabrication of the magnetic assembly as shown in FIG. 1.

By following the process just outlined, a composite circular magnetic element is fabricated which, upon removal of the two ring-shaped forms, becomes a rigid circular annular laminated assembly with two circumferential slots, as illustrated by the E-shaped cross-sectional view of the assemblies 13 and 14 in FIG. 1. By employing this fabrication procedure, I am able to use a continuous strip of very thin magnetic material to produce large-size magnetic assemblies for efficient high-frequency operation with low production cost as compared with the alternative method of using E-shaped stampings for the magnetic structure. Another advantage of my circular ring-shaped magnetic assembly is that it creates a continuous circular slot in the magnetic structure within which circular coils 21 and 22 may be assembled. In this design, the current-carrying coils 21 and 22 are completely surrounded by active magnetic material, which means that 100% of the winding is effective in generating electromagnetic forces. In the conventional assembly employing flat stacks of E-shaped laminations, rectangular-shaped coils are dropped in the parallel slots which are formed by the flat laminations and the ends of the coils remain outside the magnetic structure, and serve no useful electromagnetic function. The over-hanging portions of the rectangular coils add unnecessary moving mass to the vibrating system and also add unnecessary electrical resistance to the coils, which increases the electrical losses during the operation of the transducer.

In order to obtain the highest possible amount of active electrical conductor in the two circular slots of magnetic assemblies 13 and 14, I have chosen to wind the coils with insulated copper ribbon in much the same manner as I have described in connection with the fabrication of the laminated magnetic structures. By employing thin insulated copper ribbon for the coils 21 and 22, they can be wound to very accurate tolerances, and the copper will occupy practically the full cross-sectional areas of the circular slot when it is assembled in place. In winding the coils, the first and last turn may be folded at 90° so that the ends of the copper ribbon will project out through the open ends of the slots. These free coil ends may be again folded over and cemented in place into radially under-cut recesses in the faces of the magnetic ring assemblies 13 and 14 so that the coil ends may be brought out into the center opening of the plate member 1 without projecing into the air gap as the leads run by over the face of the magnetic assembly. The physical details for recessing a small radial slot in the faces of the magnetic assemblies 13 and 14 are not shown since they are not important in connection with the main purpose of this invention. Rather than complicate the illustrations and figures, the coils 21 and 22 are schematically shown connected together in series by the electrical conductors 23 and 24, and the complete inter-connected system of coils are in turn connected by means of electrical conductors 25 and 26 to the insulated electrical terminals 28. Electrical terminals 28 are sealed into the counter-bored region of a housing 30 as shown. A rubber-covered underwater cable 31 containing two insulated conductors 32 is molded to a metallic flanged member 33 which contains a machined groove with a conventional O-ring 34 to effect an underwater seal when flanged member 33 is bolted in position to the housing 30 by means of bolts 35. The conductors 32 are soldered to the electrical terminals 28 to establish electrical connection from an external power source into the current coils 21 and 22 for operating the transducer.

An important feature of my invention is that I achieve a very high electromagnetic efficiency by the design which has been described. By using two electromagnetic assemblies, one on each side of plate 11, I effectively double the electromagnetic drive forces for operating the transducer which is desirable for high-power underwater operation.

Figure 2:
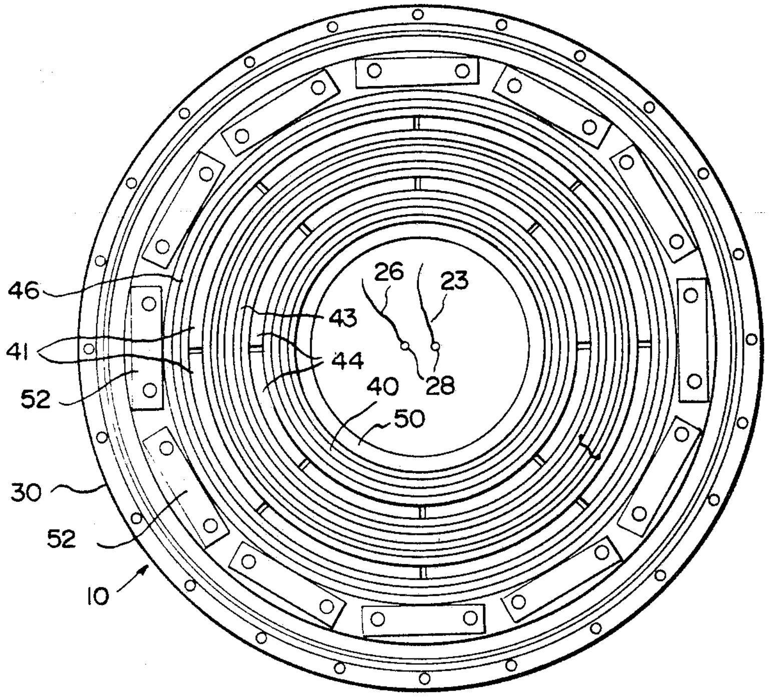
FIG. 2 is a sectional view taken along line II—II of FIG. 1.

To complete the operating electromagnetic circuit for the illustrated transducer, I prepare a pair of magnetic assemblies 37 and 38 to mate with the assemblies 13 and 14 previously described. In preparing the magnetic assemblies 37 and 38, I advantageously employ a rigid tubular member 39 to serve as a form in the same manner as member 15 is employed in the assemblies 13 and 14. Over the form 39 a tight continuous winding of thin magnetic ribbon is rigidly bonded to build up a section 40 having a thickness which is idential to the corresponding thickness of the mating section 16 of the magnetic assembly 13 or 14. At this point the winding of the thin magnetic ribbon is interrupted and a number of permanent magnets 41, shown both in FIGS. 1 and 2 and having a cylindrical contour, are bonded to the outer periphery of the fabricated section of the wound magnetic tape. The magnetic ribbon is then bonded to an outer surface portion 42 of the magnets 41, and the winding is continued until the desired thickness of magnetic material is achieved to provide a section 43 corresponding to the section 18. At this point the winding is again interrupted and a second set of magnets 44 is bonded into position, as illustrated in FIGS. 1 and 2. The cylindrical contour of the surfaces of the magnets 44 corresponds to the diameter of the built-up magnetic winding. After assembling the magnets 14 into position the magnetic ribbon is tightly bonded and wound over the outer surface 45 of the magnets 44 until the thickness of the winding is built up to the desired amount to provide a section 46 mating with the section 20 to complete the total magnetic assemblies 37 and 38.

It is noted that the wound coil assemblies can have shapes other than the illustrated cylindrical shape, such as oval, square, rectangular or other polygonal shapes, in which case the magnets have corresponding shapes. It is also noted that an electromagnet assembly can be used in place of a permanent magnet assembly in which case the assemblies 37 and 38 have constructions similar to that of the assemblies 13 and 14.

In the transducer which I have used to illustrate one application of my invention, the operation of the electromagnetic transducer results from the inertial alternating forces generated between a massive spring-suspended base member which contains a portion of the electromagnetic circuit and the driven portion of the magetic circuit which is attached to the vibratory sound radiating portion of the transducer. Having prepared the lamination and permanent magnet assemblies 37 and 38 as rigid composite cylindrical annular units, I securely bond the units onto planar recessed surfaces 47 and 48 of massive base members 49 and 50. The base members 49 and 50 are fabricated of a non-magnetic material such as bronze so as not to magnetically short-circuit the permanent magnets 41 and 44. Before bonding the magnetic assemblies 37 and 38 to the recessed surfaces 47 and 48 of parts 49 and 50, I prepare the end surfaces of the magnetic assemblies 37 and 38 by grinding or by other suitable means to make them perfect planes. The same surface preparation is preferably employed for the assembled magnetic structures 13 and 14 and prior to bonding their surfaces into the recessed sections of plate 11.

To secure the desired operation of the transducer illustrated in FIG. 1, a plurality of peripherally-mounted spring members 51 and 52 attached by means of bolts 53 and 54 to the prepared outer peripheral surface portions of parts 49 and 50, as shown. The spring members 51 and 52 preferably have intermediate portions of sufficient flexibility to permit resilient movement of the ends thereof toward and away from each other. A layer of epoxy cement may be advantageously employed between the faces of the spring members 51 and 52 and the surfaces of members 51 and 52 at the time of bolting the springs in place with bolts 53 and 54. The opposite faces of the springs 51 and 52 are secured to the outer periphery of the plate member 11 by means of nuts 55 and 56 that are secured to the studs 57 and 58 which are assembled in properly-located tapped holes in plate 11.

Figure 3:
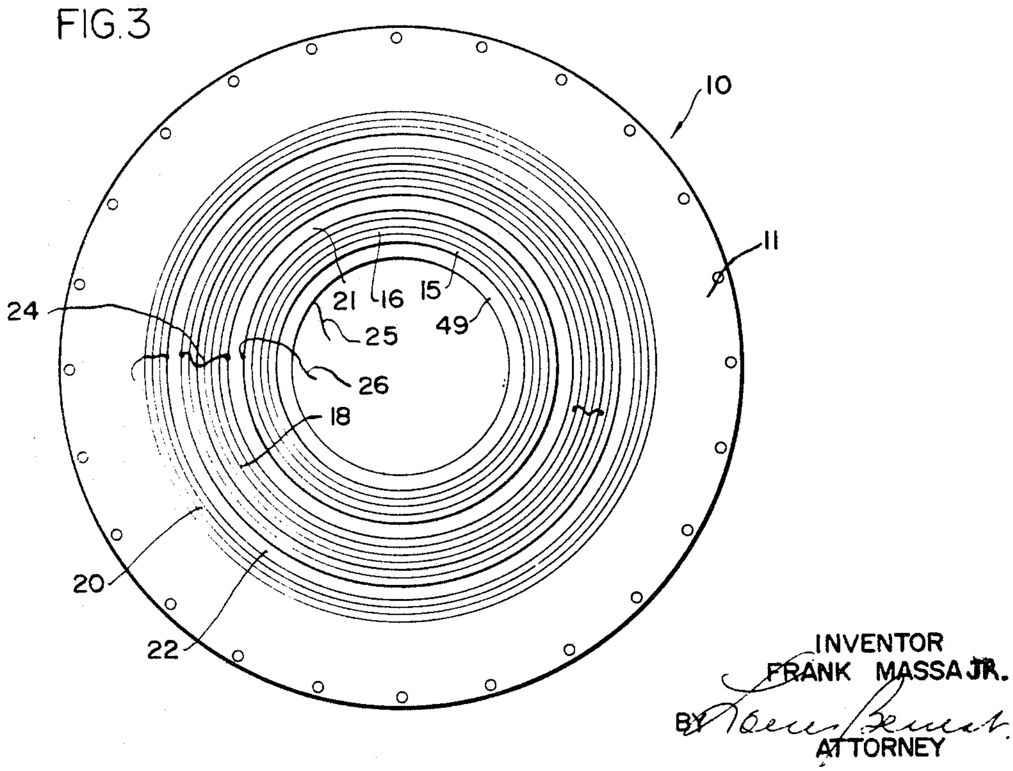
FIG. 3 is a view taken along the line III—III of FIG. 1

In order to very accurately produce a uniform and stable air gap over the entire surface of the mating magnetic elements, I perform the following operations:

After rigidly bonding the magnetic assemblies 13 and 14 into the recessed portions of plate 11, I grind the exposed ends of the magnetic lamination assembly in a plane with the peripheral face of plate 11. In other words, after the magnetic assemblies are secured in place, plate 11 is carefully ground so that its opposite faces are in perfect parallel planes, including the ends of the magnetic laminations. In the next step of my process to secure a uniform air gap, I permanently attach the spring members 51 and 52 to the peripheral faces of parts 49 and 50 by means of the bolts 53 and 54, as shown. I next grind the free unmounted faces of the spring members 51 and 52 so that they are in an exact plane with the exposed ends of the magnetic lamination assemblies 37 and 38. At this point I will have two mating magnetic assemblies, the inertial portion of the transducer containing the massiver members 49 and 50 and the spring members 51 and 52 and the driven portion of the transducer comprising the plate member 11 whose opposite parallel surfaces lie in an exact plane with the free ends of the respective magnetic assemblies. The next step is to assemble the studs 57 and 58 into the peripheral tapped holes in plate 11. Then a number of shims 59 and 60 having clearance holes to fit over the studs are placed between the surfaces of the plate 11 and the faces of the springs 51 and 52. The shims 59 and 60 will exactly determine the magnitude of the air gap which will result, and due to the placement of the shims over the entire peripheral surface of the assembled structures, the air gap will be extremely uniform to result in perfect operation of the electromechanical vibrating structure. To complete the transducer assembly, I simply attach the hemispherically-shaped housing structure 30 and a similar structure 62 to the outer peripheral surfaces of plate 11 by means of bolts 63 and 64. Tapped holes are placed about the periphery of plate 11 as illustrated in FIG. 3, in order to receive the bolts 63 and 64. O-ring grooves are provided in the end faces of the housing members 30 and 62, and O-rings 65 are used to complete the watertight seal when the housing structures are attached. Having completed the assembly of the transducer, its operation is clearly obvious from the electromagnetic forces which are generated in the air gaps when alternating current passes through the coils 21 and 22.

My invention has chosen a balanced armature type of electromagnetic transducer, and the polarity of the current and magnets is such that at any given instant a force of attraction is developed at one air gap surface while a corresponding force of repulsion is developed at the opposite air gap. In this manner the magnetic forces combine so that effectively the operating area on each side of the plate adds to contribute to the total electromagnetic driving force and thus twice the driving force may be generated prior to saturation as would be possible if only one side of the plate were equipped with a magnetic drive. It is, of course, possible to eliminate one of the two magnetic assemblies and still take advantage of the teachings of my invention. By eliminating one of the two symmetrical electromagnetic structures, the power handling capacity of the transducer will be lowered but all the remaining advantages which have been described in connection with the fabrication of the thin lamination assembly and the adjustment of the uniform air gap as well as the use of 100% active coil will be realized. Also, I have shown two concentric sections of permanent magnet in the arrangement illustrated. In a smaller transducer I could cut the E-shaped cross-sectional magnetic structure shown in FIG. 1 along its center line and use only one coil and one permanent magnet and still achieve all the advantages of the teachings of my invention. A single magnet and a single coil surrounded by the adjacent laminated magnetic structure forms the minimum active electromagnetic structure that will operate completely as an electromechanical transducer. The use of successive concentric elements in the assembly merely increases the total effective area of the electromagnetic structure.

It should be obvious to any one skilled in the art that the current in coil 22 should flow in the opposite sense to the current in coil 21 in order that the magnetic forces will be additive. It is also obvious that the common magnetic poles of the permanent magnets should face toward the center line of the E-shaped assembly, as illustrated by the N-S polarity symbols in FIGS. 1 and 2.

While there have been shown and described several specific illustrative embodiments of the present invention, it will, of course, be understood that various modifications and alternative constructions may be made without departing from the true spirit and scope of the invention. Therefore, the appended claims are intended to cover all such modifications and alternative constructions as fall within their true spirit and scope.

I claim as my invention:

1. An electromagnetic transducer comprising at least a pair of plates having substantially cup-shaped openings therein, said plates being positioned with the open sides of said cups facing each other in spaced parallel relationship, one of said plates being relatively fixed and the other of said plates being resiliently mounted on said fixed plate, at least a pair of tightly wound annular coils of a magnetically conductive ribbon, each of said coils being nestingly bonded within one of the openings on an individually associated one of said plates, the opposing faces of said coils lying in spaced parallel planes separated from each other by a predetermined distance to form an air gap between the coils, and means comprising at least one electrical coil associated with at least one of said annular coils for electromagnetically vibrating said plates relative to each other.

2. The transducer of claim 1 wherein at least one of said annular coils has a substantially E-shaped cross section, the open ends of the arms of said E-shaped forming concentric rings facing correspondingly positioned rings on the other of said annular coils, and an electrical coil fitted into the space defined by said arms of said E-shape.

3. The transducer of claim 2 wherein said one annular coil comprises a concentric series of five coils of said magnetically conductive ribbon tightly wound upon each other, said five coils having alternately wide and narrow dimensions to form said substantially E-shaped cross section.

4. The transducer of claim 1 wherein said electrical coil is ring-shaped, the cross section of one of said annular coils being a shape forming an annular space for receiving said electrical coil.

5. The transducer of clam 4 and at least one permanent magnet, the cross section of the other of said annular coils forming a space for receiving said magnet.

6. The transducer of claim 1 wherein there are three of said plates having four of said cup-shaped openings, two of said four openings being formed back-to-back in a single one of said plates which is the fixed plate, the other two of said openings being individually formed in the other two of said plates which are the resiliently mounted plates, one of the other two of said plates being mounted on one side of said fixed plate and the second of the other two of said plates being mounted on the other side of said fixed plate.

7. The transducer of claim 6 wherein there are four of said tightly wound annular coils, each being nestingly bonded within an individually associated one of said four openings to form a pair of said air gaps.

8. The transducer of claim 7 wherein each of the tightly wound annular coils in said back-to-back openings includes a ring-shaped opening for receiving the associated electrical coil.

9. The transducer of claim 8 wherein each of said tightly wound annular coils comprises a series of coils having alternately wide and narrow dimensions to form substantially E-shaped cross sections.

10. The transducer of claim 9 wherein the open ends of the arms of said E-shaped section form a series of concentric rings facing each other in spaced parallel relationship to form said air gaps, the open arms in the E-shape on one side of each gap forming said ring-shaped opening.

References Cited

UNITED STATES PATENTS

| | | | |
|---|---|---|---|
| 2,962,679 | 11/1960 | Stratton. | |
| 3,225,326 | 12/1965 | Massa | 340—8 |
| 3,230,502 | 1/1966 | Chervenak | 340—8 XR |
| 3,363,227 | 1/1968 | Massa | 340—8 |

RODNEY D. BENNETT, Jr., *Primary Examiner.*

B. L. RIBANDO, *Assistant Examiner.*